Oct. 9, 1934.                R. P. PESCARA              1,976,630
        METHOD AND APPARATUS FOR EFFECTING COMBUSTION
                  IN INTERNAL COMBUSTION ENGINES
                      Filed Jan. 5, 1933        2 Sheets-Sheet 1
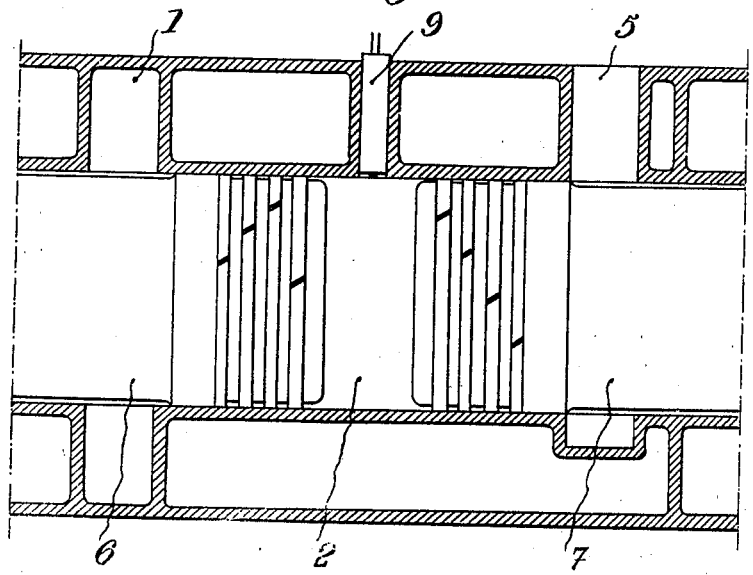
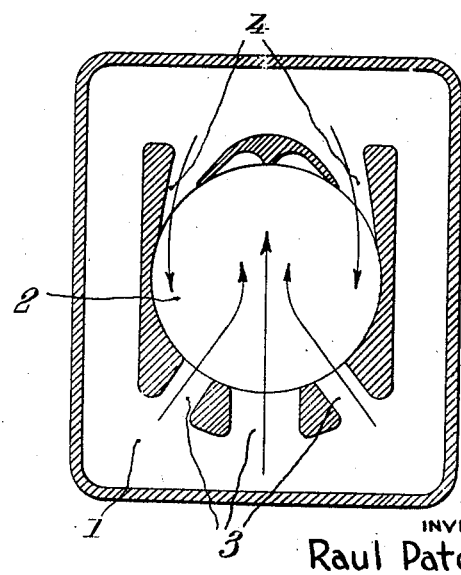
INVENTOR.
Raul Pateras Pescara
BY
ATTORNEY Oct. 9, 1934.  R. P. PESCARA  1,976,630
METHOD AND APPARATUS FOR EFFECTING COMBUSTION
IN INTERNAL COMBUSTION ENGINES
Filed Jan. 5, 1933   2 Sheets-Sheet 2

INVENTOR
Raul Pateras Pescara
BY
ATTORNEY

Patented Oct. 9, 1934

1,976,630

UNITED STATES PATENT OFFICE 1,976,630

METHOD AND APPARATUS FOR EFFECTING COMBUSTION IN INTERNAL COMBUSTION ENGINES

Raul Pateras Pescara, Paris, France

Application January 5, 1933, Serial No. 650,347
In France January 22, 1932

10 Claims. (Cl. 123—32)

The present invention relates to methods and apparatus for effecting combustion in internal combustion engines, and more especially, in those of the Diesel and related types.

It is a common practice, in Diesel engines, to introduce blasts of air substantially tangentially to the walls of the combustion chamber so that the fuel injected takes the form of a single vortex, all the blasts tending to whirl in the same direction. This procedure has the disadvantage of distributing the explosive mixture, during the injection, along a zone close to the cylinder walls. As a consequence, during combustion, very considerable portions of heat escape through the cylinder walls.

One of the objects of the present invention is to invert the general procedure above referred to and concentrate the combustion zone in the vicinity of the centre of the cylinder, whereby heat losses through the cylinder walls are diminished.

Other objects will appear in the course of the detailed description now to be given with reference to the accompanying drawings, in which:

Fig. 1 is a longitudinal axial section through a motor-compressor including opposed, aligned pistons and fitted with one of the air injecting systems illustrated in figures which follow;

Fig. 2 is a transverse section through the motor cylinder in Fig. 1 at a point where air is introduced into the latter;

Figure 3:
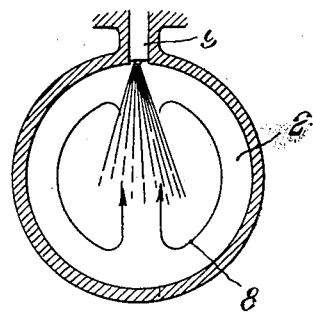
Fig. 3 is a transverse section through a cylinder provided with a single jet type of injector showing the effect of fuel injection on the air currents of the type produced by air injecting systems such as are shown in Fig. 2.

The invention will be described with relation to a two cycle motor-compressor fitted with opposed, aligned pistons but is to be understood that the invention is applicable to motors of the Diesel and related types of whatever design.

Fig. 1 illustrates such a motor-compressor and includes a cylinder 2, supporting a pair of opposed, aligned pistons 6 and 7, the latter controlling respectively, an air inlet port 1, and an exhaust port 5, fuel being introduced between the pistons by an injector 9 of any desired type. This assembly is well known.

Figure 6:
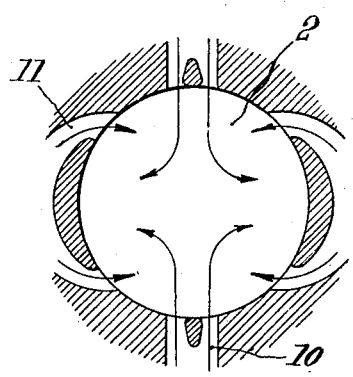
Fig. 6 is a diagrammatic section through a second possible air injecting system adapted to be used with cylinders of the type shown in Fig. 1.

The present invention is concerned, more particularly with the design of air supply or injecting conduits or ports 1. Instead of the latter being all arranged tangentially with respect to the cylinder walls so that the blasts produced tend to whirl in the same direction, as is usually the case, a plurality of air supply conduits are positioned as shown in Figures 2 and 6 so as to produce both radial and tangential air currents thus concentrating the explosive mixture in a zone lying centrally with relation to the cylinder walls.

In the system shown in Figure 2, a plurality of radial conduits or ports 3 produce a centripetal air current and the latter ports co-act with a pair of tangential air supply conduits or ports 4 to produce a pair of vortices tending to move the fuel injected into the cylinder towards the centre of the latter.

Fig. 3 shows how lateral vortices 8 impinge upon one another so as to move fuel towards the centre of the cylinder and away from the walls of the latter.

Figure 4:
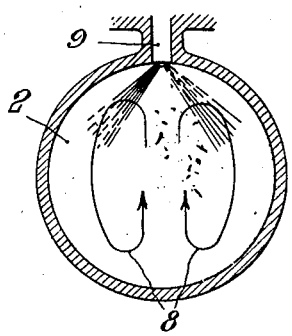
Fig. 4 is a similar section through a cylinder provided with a double jet fuel injector.

Fig. 4 illustrates, in a similar manner, the action of the pair of vortices produced by an air injecting system such as is shown in Fig. 2, on the double jet coming from an injector.

Figure 5:
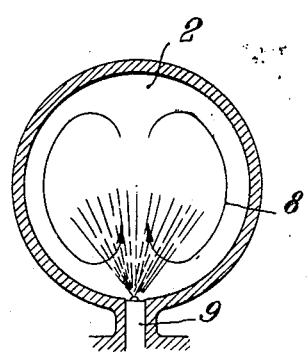
Fig. 5 illustrates, in section, the effect of a single jet fuel injector, when the latter is placed in a position diametrically opposed to the one represented in Fig. 3.

In Fig. 5, fuel injector 9 is positioned at 180° to the one shown in Fig. 3, and the air vortices 8 flow in the same direction as the fuel jet instead of, as in Fig. 3, flowing counter-currently with relation thereto. In both cases, however, the explosive mixture is concentrated in the central zone of the cylinder.

In the air injecting system represented in Fig. 6, a group of four centrally directed vortices are produced by a pair of diametrically opposed (radial) double ports 10 coacting with two pairs of tangentially (these ports, as shown, are not tangential, and need not be, provided their direction is such as to yield a predominantly tangential component) position ports 11, lying in pairs at 90° to ports 10.

Figure 7:
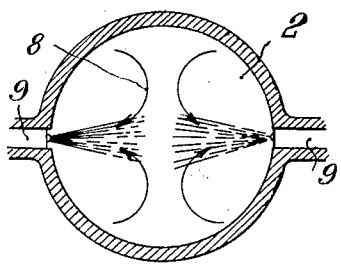
Fig. 7 illustrates, in section, the effect of a pair of diametrically opposed jets on the air currents produced by a system of the type shown in Fig. 6.
Figure 8:
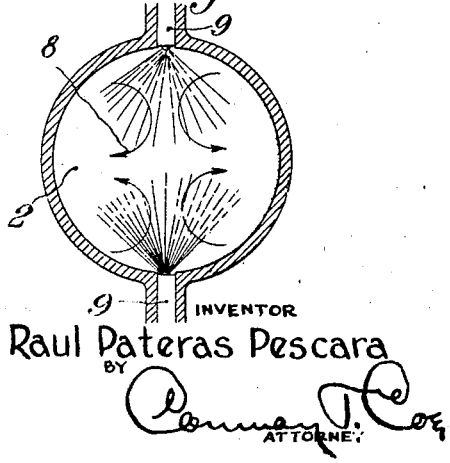
Fig. 8 is a section similar to Fig. 7 showing what happens when the diametrically opposed jets are positioned at 90° to those illustrated in the latter figure.

Fig. 7 shows what happens when a pair of opposed fuel jets from injectors 9 strike the air currents produced by the air injecting system shown in Fig. 6. Fig. 8 illustrates in a similar manner, the action of these air currents on jets lying at 90° to those shown in Fig. 7. In the system represented in Fig. 7, it will be noted that the fuel flows in a counter-current direction to vortices 8 while in Fig. 8 the same fuel jets flow concurrently with the air vortices. In both cases the tendency of the explosive mixture is to concentrate in a central zone at a distance from the cylinder walls.

Obviously the air jets from ports 3 and 10 need not be exactly radial or parallel to a radius but should be predominantly so.

What I claim is:—

1. A two cycle internal combustion engine comprising a cylinder having inlet openings in the walls thereof and a piston sliding in said cylinder, said inlet openings being located so as to be uncovered by the piston near the end of its stroke, said inlet openings being so arranged as to direct the entering air into a plurality of substantially closed paths whirling around axes which are substantially parallel to the axis of the cylinder substantially tangentially to one another, the air in the paths traveling in the same direction at the points of tangency, and means to inject fuel into said cylinder substantially radially thereof and substantially along the line of tangency of said paths.

2. In an engine as claimed in claim 1, said inlet openings including an opening substantially radial to said cylinder and a pair of substantially radial converging openings on either side of said first opening.

3. In an engine according to claim 1, said inlet openings including an opening substantially radial with respect to said cylinder, the wall of said cylinder including two deflecting surfaces and a member separating said surfaces arranged at a point opposite the said radial opening.

4. In an engine according to claim 1, said inlet openings including a pair of radially arranged openings located at opposite sides of the cylinder.

5. In an engine according to claim 1, said inlet openings including a pair of openings directed substantially tangentially to the cylinder and in opposite directions.

6. In an engine according to claim 1, said inlet openings including a pair of openings directed substantially tangentially to the wall of the cylinder and in opposite directions, a third opening, the wall of said cylinder between said first openings including deflecting surfaces arranged in the path of air entering through said third opening.

7. In an engine according to claim 1, said inlet openings including two pairs of openings arranged on opposite sides of the cylinder and each comprising two openings arranged substantially tangentially of the cylinder and extending in opposite directions.

8. In an engine according to claim 1, said inlet openings including two pairs of openings arranged on opposite sides of the cylinder and each comprising two openings arranged substantially tangentially of the cylinder and extending in opposite directions, and substantially radial inlet openings arranged between said pairs of openings.

9. In an engine according to claim 1, said inlet openings including two pairs of openings arranged on opposite sides of the cylinder and each comprising two openings arranged substantially tangentially of the cylinder and extending in opposite directions, said injecting means comprising two injectors mounted at opposite ends of the diameter of the cylinder and symmetrically located with respect to said tangential openings.

10. In an engine according to claim 1, said inlet openings including two pairs of openings arranged on opposite sides of the cylinder and each comprising two openings arranged substantially tangentially of the cylinder and extending in opposite directions, and substantially radial inlet openings arranged between said pairs of openings, said injecting means comprising two injectors mounted at opposite ends of the diameter of the cylinder and symmetrically located with respect to said tangential openings.

RAUL PATERAS PESCARA.